United States Patent
Taura et al.

(10) Patent No.: US 10,220,488 B2
(45) Date of Patent: Mar. 5, 2019

(54) ABRASIVE FILM

(71) Applicant: BANDO CHEMICAL INDUSTRIES, LTD., Hyogo (JP)

(72) Inventors: Toshikazu Taura, Kobe (JP); Kazuo Saito, Kobe (JP)

(73) Assignee: BANDO CHEMICAL INDUSTRIES, LTD., Hyogo (JP)

(*) Notice: Subject to any disclaimer, the term of this patent is extended or adjusted under 35 U.S.C. 154(b) by 0 days.

(21) Appl. No.: 15/505,248

(22) PCT Filed: Aug. 5, 2015

(86) PCT No.: PCT/JP2015/072198
§ 371 (c)(1),
(2) Date: Feb. 21, 2017

(87) PCT Pub. No.: WO2016/027671
PCT Pub. Date: Feb. 25, 2016

(65) Prior Publication Data
US 2017/0266781 A1     Sep. 21, 2017

(30) Foreign Application Priority Data
Aug. 21, 2014   (JP) ................................ 2014-168680

(51) Int. Cl.
B24D 3/00 (2006.01)
G02B 6/38 (2006.01)
B24D 11/00 (2006.01)

(52) U.S. Cl.
CPC .............. B24D 3/00 (2013.01); B24D 11/001 (2013.01); G02B 6/3847 (2013.01); G02B 6/3863 (2013.01)

(58) Field of Classification Search
CPC ...... B24D 3/00; B24D 11/001; G02B 6/3847; G02B 6/3863
See application file for complete search history.

(56) References Cited

U.S. PATENT DOCUMENTS

| | | | |
|---|---|---|---|
| 5,643,669 A | 7/1997 | Tsuei | |
| 2004/0005460 A1* | 1/2004 | Yamazaki | B24B 19/226 428/404 |
| 2010/0107509 A1* | 5/2010 | Guiselin | B24D 3/00 51/298 |

FOREIGN PATENT DOCUMENTS

| | | |
|---|---|---|
| JP | H06262532 | 9/1994 |
| JP | 2000506558 | 5/2000 |

(Continued)

OTHER PUBLICATIONS

"International Search Report (Form PCT/ISA/210) of PCT/JP2015/072198", dated Oct. 20, 2015, with English translation thereof, pp. 1-4.

*Primary Examiner* — Pegah Parvini
(74) *Attorney, Agent, or Firm* — JCIPRNET

(57) ABSTRACT

Provided is an abrasive film not likely to cause an end face defect of an optical fiber connector due to variation in load conditions during polishing, while providing a great grinding force. The abrasive film comprises a substrate film and an abrasive layer overlaid thereon, the abrasive layer comprising abrasive particles and a binder therefor and a wear quantity of the abrasive layer being from 10 mg to 25 mg. A content of the abrasive particles in the abrasive layer is preferably no less than 85% by mass. The abrasive particles preferably comprise first abrasive particles (primary particle diameter: of no less than 10 nm and less than 50 nm), and second abrasive particles (primary particle diameter: no less than 50 nm and less than 250 nm). An average thickness of the abrasive layer is preferably from 4 μm to 15 μm. The abrasive particles are preferably silica particles.

4 Claims, 2 Drawing Sheets

(56) References Cited

FOREIGN PATENT DOCUMENTS

| | | |
|---|---|---|
| JP | 2002103238 | 4/2002 |
| JP | 2002239921 | 8/2002 |
| JP | 2007190613 | 8/2007 |
| JP | 2010274348 | 12/2010 |
| WO | 02092286 | 11/2002 |

* cited by examiner

ABRASIVE FILM

CROSS-REFERENCE TO RELATED APPLICATION

This application is a 371 application of International PCT application serial no. PCT/JP2015/072198, filed on Aug. 5, 2015, which claims the priority benefit of Japan application No. 2014-168680, filed on Aug. 21, 2014, The entirety of each of the above-mentioned patent applications is hereby incorporated by reference herein and made a part of this specification.

TECHNICAL FIELD

The present invention relates to an abrasive film.

BACKGROUND ART

In optical fiber communication networks, easily detachable connectors are widely used for connection between optical fibers. The connection is provided by butting ferrules, which are used for positioning of the optical fibers, directly against each other. Given this, in order to reduce optical loss (communication loss) from the optical fiber after the connection, a connection end face of the optical fiber connector to be connected is required to have a sufficiently smooth surface and not to generate a gap between optical fibers at the connection end faces (not to have an undercut of the optical fiber with respect to the ferrule).

Polishing of such a connection end face of an optical fiber is carried out in four steps of: removal of an adhesive; rough polishing of a spherical surface; intermediate finishing; and finish polishing. The finish polishing is carried out by pressing with a force an optical fiber connector against, while supplying water to, a surface of an abrasive film adhesively fixed onto a surface of an elastic pad.

Optical loss resulting from the finish polishing is caused primarily by end face defects such as scratches and a chipped edge due to an insufficient grinding force of the abrasive film, and decreases productivity and production cost-effectiveness of the optical fiber connector. Given this, an abrasive film used in the step of finish polishing is required to have a great grinding force.

As the abrasive film having a great grinding force, an abrasive film has been proposed that comprises an abrasive layer containing abrasive particles and a binder, in which a material for the binder is specially designed (refer for example to Japanese Unexamined Patent Application, Publication No. 2007-190613). In this conventional abrasive film, epoxy urethane, which is resistant to wear, is employed as a material for the binder to firmly fix abrasive particles in the abrasive layer, to thereby improve a grinding force.

However, in light of productivity and production cost of the optical fiber connector, the grinding force of this conventional abrasive film is not considered to be sufficient. In addition, with this conventional abrasive film, a smaller load leads to insufficient grinding force, in turn a substantial rise in a rate of defects occurring on an end face. Consequently, an end face defect is likely to occur due to variation in load conditions during polishing.

PRIOR ART DOCUMENTS

Patent Documents

Patent Document 1: Japanese Unexamined Patent Application, Publication No. 2007-190613

SUMMARY OF THE INVENTION

Problems to be Solved by the Invention

The present invention has been made in view of the aforementioned situation, and an object of the invention is to provide an abrasive film that is not likely to cause an end face defect of an optical fiber connector due to variation in load conditions during polishing, while providing a great grinding force.

Means for Solving the Problems

As a result of a thorough investigation, the present inventors have found that a considerable increase in a grinding force is enabled by, contrary to a conventional process of inhibiting wear of the abrasive layer, promoting wear of the abrasive layer, thus the present invention was accomplished.

Specifically, according to an aspect of the invention made for solving the aforementioned problems, an abrasive film comprises a substrate film and an abrasive layer that is overlaid on a top face side of the substrate film, wherein: the abrasive layer comprises abrasive particles and a binder for the abrasive particles; and a wear quantity of the abrasive layer as determined by a Taber abrasion test is no less than 10 mg and no greater than 25 mg.

Since the wear quantity of the abrasive layer of the abrasive film is no less than the aforementioned lower limit, the abrasive particles are transferred into water supplied during polishing of an optical fiber connector as the abrasive layer is being worn, and function as loose abrasives to polish the optical fiber connector along with fixed abrasives in the abrasive layer. The abrasive film thus has a great grinding force. In addition, since loose abrasives required for polishing are provided through wearing of the abrasive layer even with a small load applied to the optical fiber connector, a defect is not likely to occur on an end face of the optical fiber connector, and a defect is not likely to occur due to variation in load conditions. Meanwhile, since the wear quantity of the abrasive layer of the abrasive film is no greater than the aforementioned upper limit, a wear quantity of the abrasive layer per polishing round can be kept small, whereby the abrasive film can be used for a great number of times while maintaining a great grinding force.

A content of the abrasive particles in the abrasive layer is preferably no less than 85% by mass. When the content of the abrasive particles in the abrasive layer is no less than the aforementioned lower limit, a further improvement of the grinding force is enabled.

It is preferable that: the abrasive particles comprise first abrasive particles having a primary particle diameter of no less than 10 nm and less than 50 nm, and second abrasive particles having a primary particle diameter of no less than 50 nm and less than 250 nm; and a content of the first abrasive particles is no less than 55% by mass and no greater than 80% by mass, and a content of the second abrasive particles is no less than 15% by mass and no greater than 45% by mass, with respect to the total abrasive particles. The abrasive particles comprising the two types of abrasive particles, with the respective contents of the two types of abrasive particles falling within the above ranges, enable the wear quantity of the abrasive layer to be easily controlled to be within the above range.

A content of the second abrasive particles having a primary particle diameter of no less than 100 nm and less than 250 nm is preferably no less than 5% by mass and no greater than 25% by mass with respect to the total abrasive particles. When the content of the second abrasive particles having a primary particle diameter of no less than 100 nm and less than 250 nm falls within the above range, the wear quantity of the abrasive layer is enabled to be more easily controlled to be within the above range.

An average thickness of the abrasive layer is preferably no less than 4 μm and no greater than 15 μm. When the average thickness of the abrasive layer falls within the above range, enhancement of durability is enabled while preventing an increase in production cost.

The abrasive particles are preferably silica particles. Since silica particles are abrasive particles that are suitable for use in a final finishing step in which a low surface roughness is required for a connection end face of the optical fiber connector, employing the silica particles enables a great grinding force to be provided while maintaining polishing accuracy.

The "wear quantity" as referred to means a value obtained by: providing three test pieces (average diameter: 100 mm, average thickness: no less than 0.08 mm and no greater than 0.09 mm); rotating each test piece 50 times by using a Taber abrasion tester under conditions involving a load of 4.9 N and a rotational speed of 72 rpm, with an abrasive wheel CS-10; and calculating and averaging differences in mass of the test pieces before and after the 50 rotations. In addition, the term "primary particle" as referred to means a particle that may be considered as a unit particle from a geometric configuration thereof, the term "primary particle diameter" as referred to means a diameter of a particle measured by using an image of the particle observed by way of a scanning electron microscope (SEM) or a transmission electron microscope (TEM), and the term "diameter of a particle" as referred to means a diameter of a minimum circle circumscribed to the image of the particle.

Effects of the Invention

As explained in the foregoing, the abrasive film according to the present invention is not likely to cause an end face defect of an optical fiber connector due to variation in load conditions during polishing, while providing a great grinding force. Therefore, the abrasive film can be suitably used in a step of finish polishing of an optical fiber connector.

DESCRIPTION OF EMBODIMENTS

Embodiments of the present invention will be described in detail hereinafter with reference to the drawings as necessary.

Abrasive Film

Figure 1:
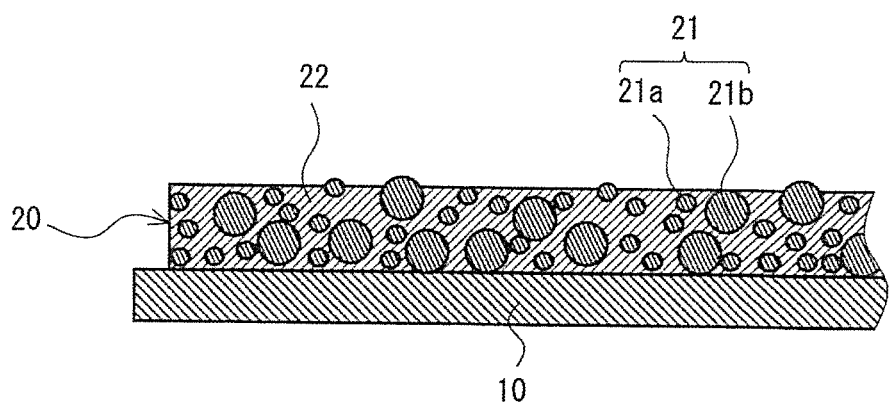
FIG. 1 is a schematic cross sectional view of an abrasive film according to an embodiment of the present invention.

The abrasive film illustrated in FIG. 1 comprises a substrate film 10 and an abrasive layer 20 that is overlaid on a top face side of the substrate film 10.

(Substrate Film)

Although a material for the substrate film 10 is not particularly limited, a material that has appropriate rigidity and ensures favorable adhesiveness and cohesiveness to the abrasive layer 20 is preferred. As such a material, a well-known thermoplastic resin may be employed that is exemplified by acrylic, polycarbonate, polyethylene terephthalate (PET), polypropylene (PP), polyethylene (PE), and the like. As the substrate film 10, a biaxially stretched film of PET, PP, PE, or the like may also be employed. Furthermore, a surface of the substrate 10 may be subjected to a treatment for increasing adhesiveness such as a chemical treatment, corona treatment, primer treatment and the like.

Although a size and a planar shape of the substrate film 10 are not particularly limited, the size and the planar shape may be, for example, a square shape of 127 mm×127 mm, or a circular shape of 127 mm in diameter. Alternatively, a configuration in which a plurality of substrate films 10 aligned on a planar surface are supported by a single support may also be employed.

Although an average thickness of the substrate film 10 is not particularly limited, the average thickness may be, for example, no less than 30 μm and no greater than 150 μm. When the average thickness of the substrate film 10 is less than the lower limit, strength and flatness of the abrasive film may be insufficient. On the other hand, when the average thickness of the substrate film 10 is greater than the above-defined upper limit, the abrasive film may be unnecessarily thick and thus difficult to handle.

(Abrasive Layer)

The abrasive layer 20 comprises abrasive particles 21 and a binder 22 therefor.

The lower limit of the average thickness of the abrasive layer 20 is preferably 4 μm, and more preferably 5 μm. Meanwhile, the upper limit of the average thickness of the abrasive layer 20 is preferably 15 μm, more preferably 10 μm, and further more preferably 8 μm. When the average thickness of the abrasive layer 20 is less than the lower limit, durability of the abrasive film may be insufficient. On the other hand, when the average thickness of the abrasive layer 20 is greater than the above-defined upper limit, the abrasive film may be unnecessarily thick, leading to increased amounts of row materials used, in turn increased production cost.

The lower limit of a wear quantity of the abrasive layer 20 as determined by the Taber abrasion test is 10 mg, more preferably 12 mg, and further more preferably 13 mg. Meanwhile, the upper limit of the wear quantity of the abrasive layer 20 as determined by the Taber abrasion test is 25 mg, more preferably 20 mg, and further more preferably 18 mg. When the wear quantity of the abrasive layer 20 as determined by the Taber abrasion test is less than the lower limit, the grinding force may be insufficient due to a reduced amount of the loose abrasives provided by the abrasive film under a small load, leading to an end face defect of an optical fiber connector due to variation in load conditions during polishing. On the other hand, when the wear quantity of the abrasive layer 20 as determined by the Taber abrasion test is greater than the upper limit, the abrasive layer 20 may be worn out by polishing in a comparatively shorter period of time, and an acceptable product may not be obtained.

The grinding force of the abrasive layer will now be discussed. The abrasive film promotes wear of the abrasive layer to transfer the abrasive particles from the worn abrasive layer into water supplied during polishing of an optical fiber connector. It is considered that the transferred abrasive particles would function as loose abrasives to polish the optical fiber connector along with fixed abrasives in the abrasive layer, whereby the grinding force is considerably increased.

The present inventors have conducted the following test in order to obtain the lower limit of the wear quantity required to considerably increase the grinding force of the film. First, eight types of abrasive sheets with abrasive layers having different compositions were provided as the abrasive film, and a wear quantity of each sheet was determined. The wear quantity was obtained by: providing three test pieces (average diameter: 100 mm, average thickness: no less than 0.08 mm and no greater than 0.09 mm); rotating each test piece 50 times by using a Taber abrasion tester under conditions involving a load of 4.9 N and a rotational speed of 72 rpm, with an abrasive wheel CS-10; and calculating and averaging differences in mass of the test pieces before and after the 50 rotations. Subsequently, a polishing test of 24 optical fiber connector terminals each provided by attaching an optical fiber to a ferrule ("SC ferrule" available from Seikoh Giken Co., Ltd.) was conducted by using these abrasive sheets. Specifically, the abrasive film was punched to give a circular shape of 127 mm in diameter and adhesively fixed onto an elastic pad (hardness: 55°) of a polishing machine ("OFL-15" available from Seikoh Giken Co., Ltd.). A connection end face of the optical fiber connector, having been subjected to intermediate finish polishing, was subjected to final finish polishing for 60 seconds with a load of 1,500 g and at a rotation rate of 180 rpm, with ion exchanged water as a polishing liquid. A polished face of the polished optical fiber connector was observed by using "Video Fiber Microscope" available from Westover Scientific, Inc. The optical fiber connector having a favorable end face with no adhered matter and no scratch being observed was assessed as an "acceptable product", and the optical fiber connector having an unfavorable end face with an adhered matter or a scratch being observed was assessed as an "unacceptable product". This assessment was conducted for 24 polished terminals, and the acceptable product rate was calculated based on the results thereof according to the following formula:

Acceptable product rate=(Number of acceptable products)/24×100(%).

Figure 2:
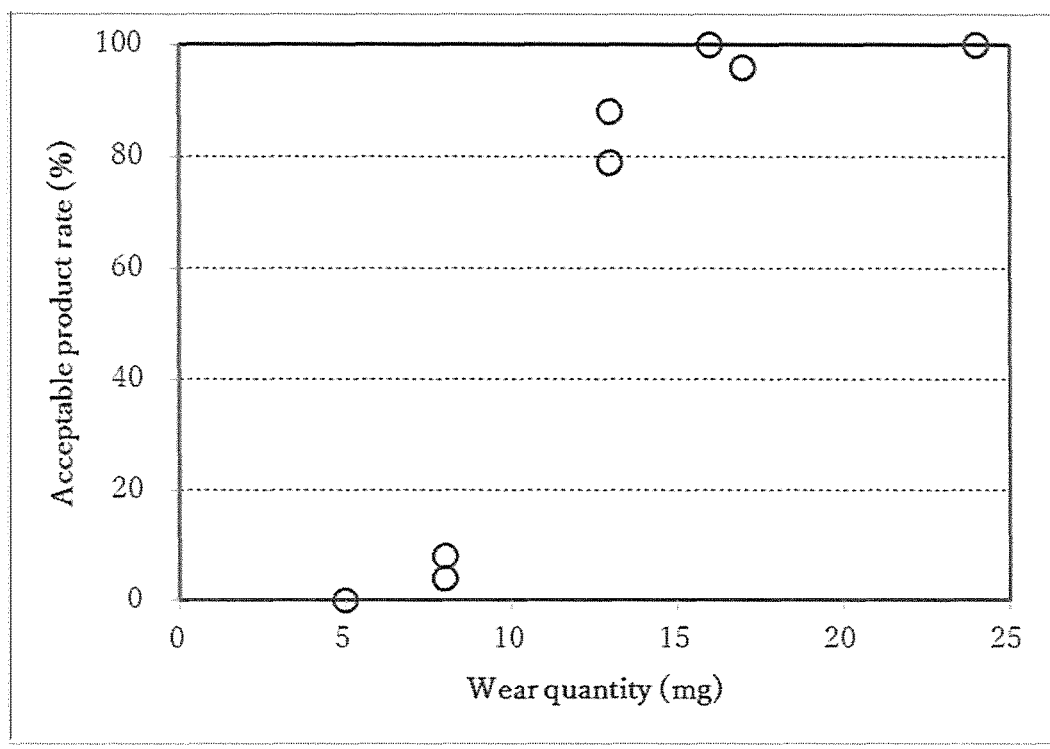
FIG. 2 shows a graph indicating a relationship between a wear quantity of an abrasive layer and an acceptable product rate of a polished optical fiber connector.

A relationship between the wear quantity of the abrasive layer and the acceptable product rate was obtained based on the determination results. The results are shown in FIG. 2. FIG. 2 reveals that the wear quantity of the abrasive layer correlates with the acceptable product rate. Since an insufficient grinding force of the abrasive film results in an unfavorable end face, thereby leading to an increased number of unacceptable products, an abrasive film exhibiting a wear amount of no less than 10 mg, which gives a high acceptable product rate, is considered to have a sufficient grinding force. The lower limit of the wear quantity required to considerably increase the grinding force of the abrasive film by the loose abrasives is thus concluded to be 10 mg.

Next, the durability of the abrasive layer will be discussed. The durability of the abrasive film depends on a wear quantity of the abrasive layer per polishing round, and the wear quantity of the abrasive layer per polishing round is determined by a mathematical product of a wear quantity of the abrasive layer per unit time and a polishing time period. Therefore, even with an increased wear quantity of the abrasive layer per unit time, if a great grinding force considerably decreases the polishing time period, the mathematical product of the wear quantity of the abrasive layer per unit time and the polishing time period is decreased, whereby the wear quantity of the abrasive layer per polishing round is decreased, leading to an increase of the durability of the abrasive film. The present inventors have focused on this relationship and found that, by promoting wear of the abrasive layer to transfer a great amount of abrasive particles as loose abrasives into water supplied during polishing, the grinding force of the abrasive film is considerably increased, whereby the polishing time period is decreased and thus the durability of the abrasive film is also increased.

The wear quantity of the abrasive layer enabling the durability of the abrasive film to be increased has an upper limit, which is considered to depend on a plateau of an effect of increasing a grinding force of the abrasive film by the loose abrasives. Specifically, when a particularly great load is applied, the wear quantity of the abrasive film is increased and a greater amount of the loose abrasives is provided, whereby the grinding force is further increased. However, it is considered that when the wear quantity is too great, the grinding force is not increased in accordance with an amount of the loose abrasives provided being increased, whereby wear is promoted and the wear quantity of the abrasive layer per polishing round is increased. The acceptable product rate becomes plateau at approximately 25 mg as shown in FIG. 2, which suggests that an effect of increasing the grinding force of the abrasive film is plateau. Accordingly, the upper limit of the wear quantity has been determined to be 25 mg.

(Abrasive Particle)

The abrasive particles 21 are exemplified by particles of diamond, alumina, silica, ceria, silicon carbide, and the like. Of these, silica particles providing a great grinding force and a scratch-free polished end face are preferred. As the silica particles, for example, particles of well-known silica such as colloidal silica, dry silica, wet silica, fused silica may be used. As used herein, "colloidal silica" may include organo-silica sol in which colloidal silica is dispersed in an organic solvent.

The lower limit of the content of the abrasive particles 21 in the abrasive layer 20 is preferably 85% by mass, and more preferably 88% by mass. Whereas, the upper limit of the content of the abrasive particles 21 in the abrasive layer 20 is preferably 95% by mass, and more preferably 92% by mass. When the content of the abrasive particles 21 in the abrasive layer 20 is less than the lower limit, the grinding force of the abrasive film may be insufficient. On the other hand, when the content of the abrasive particles 21 in the abrasive layer 20 is greater than the upper limit, an amount of the loose abrasives provided from the abrasive layer 20 is excessively increased and the polishing accuracy of the abrasive film may be insufficient.

It is preferable that: the abrasive particles 21 comprise first abrasive particles 21*a* having a primary particle diameter of no less than 10 nm and less than 50 nm, and second abrasive particles 21*b* having a primary particle diameter of no less than 50 nm and less than 250 nm. By employing the abrasive particles 21 having different primary particle diameters, the abrasive layer 20 is not likely to be dense and thus the wear quantity of the abrasive layer 20 is enabled to be suitably controlled.

The lower limit of the content of the first abrasive particles 21*a* with respect to the total abrasive particles 21 is preferably 55% by mass, and more preferably 60% by mass. Whereas, the upper limit of the content of the first abrasive particles 21*a* with respect to the total abrasive particles 21 is preferably 80% by mass, and more preferably 75% by mass. When the content of the first abrasive particles 21*a* with respect to the total abrasive particles 21 is less than the lower limit, the grinding force of the abrasive film may be insufficient. On the other hand, when the content of the first abrasive particles 21*a* with respect to the total abrasive particles 21 is greater than the upper limit, the abrasive layer may become dense and thus the wear quantity of the abrasive layer 20 may be insufficient.

The lower limit of the content of the second abrasive particles 21b with respect to the total abrasive particles 21 is 15% by mass, and more preferably 25% by mass. Whereas, the upper limit of the content of the second abrasive particles 21b with respect to the total abrasive particles 21 is preferably 45% by mass, and more preferably 35% by mass. When the content of the second abrasive particles 21b with respect to the total abrasive particles 21 is less than the lower limit, the abrasive layer may become dense due to the first abrasive particles 21a and thus the wear quantity of the abrasive layer 20 may be insufficient. On the other hand, when the content of the first abrasive particles 21b with respect to the total abrasive particles 21 is greater than the upper limit, the grinding force of the abrasive film may be insufficient due to coarse particles having such a primary particle diameter.

The lower limit of a content of abrasive particles having a primary particle diameter of no less than 100 nm and less than 250 nm among the second abrasive particles 21b (hereinafter, may be also referred to as "larger diameter second abrasive particles"), with respect to the total abrasive particles is preferably no less than 5% by mass, and more preferably 8% by mass. Whereas, the upper limit of the content of the larger diameter second abrasive particles with respect to the total abrasive particles 21 is preferably 25% by mass, and more preferably 20% by mass. When the content of the larger diameter second abrasive particles with respect to the total abrasive particles 21 is less than the lower limit, the number of starting points for wear of the abrasive layer 20 may be small and thus the wear quantity of the abrasive layer 20 may be insufficient. On the other hand, when the content of the larger diameter second abrasive particles with respect to the total abrasive particles 21 is greater than the upper limit, the grinding force of the abrasive film may be insufficient due to the coarse particles having such a primary particle diameter. In this regard, when the larger diameter second abrasive particles having a primary particle diameter of no less than 100 nm are present in a predetermined amount, the larger diameter second abrasive particles function as the starting points for wear, and the wear quantity of the abrasive layer 20 is enabled to be more easily controlled.

(Binder)

The binder 22 holds the abrasive particles 21 in a dispersed state, and fixes the abrasive layer 20 to the substrate film 10.

A resin or an elastomer may be used as a principal component of the binder 22. The resin may be exemplified by an acrylic resin, a urethane resin, an epoxy resin, a cellulose resin, a vinyl resin, a phenoxy resin, a phenol resin, a polyester, and the like. Examples of the elastomer include a natural rubber, a polyisobutylene rubber, an isoprene rubber, a nitrile rubber, an acrylonitrile-butadiene rubber, an ethylene propylene rubber, a styrene-butadiene rubber, a butadiene rubber, a chloroprene rubber, a silicone rubber, a fluorine rubber, an acrylic rubber, a urethane rubber, and the like. In a case in which a resin is used as the principal component, an acrylic resin, an epoxy resin, a cellulose resin, and polyester, which are likely to provide favorable dispersibility of the abrasive particles 21 and favorable adhesiveness to the substrate film 10, are preferred. In a case in which an elastomer is used as the principal component, in light of adhesiveness to the substrate 10 and handleability, an acrylonitrile-butadiene rubber, a urethane rubber, and an acrylic rubber are preferred. Furthermore, the resin may be at least partially crosslinked, and may contain a curing agent such as polyisocyanate and acrylate. The term "principal component" as referred to means a component which is of the highest content, for example a component of which content is no less than 50% by mass.

The resin binder 22 may contain various types of auxiliary agent, additive and the like ad libitum, such as a resin other than the principal component, a crosslinking agent, a dispersant, a coupling agent, a surfactant, a lubricant, a defoaming agent, a colorant, and the like according to a purpose.

Production Method of Abrasive Film

As the production method of the abrasive film, a well-known technique for production of a thin film can be employed that can secure sufficient adhesiveness and cohesiveness between the substrate film 10 and the adhesive layer 20. The production method of the abrasive film includes steps of, for example: preparing a coating liquid; applying the coating liquid onto a surface of the substrate film 10; and drying the coating liquid thus applied.

First, in the step of preparing a coating liquid, a solution in which the abrasive particles 21 and the binder 22 are dispersed in a solvent is prepared as the coating liquid. The solution is not particularly limited as long as the binder 22 is soluble therein. Specifically, methyl ethyl ketone (MEK), isophorone, terpineol, N-methylpyrrolidone, cyclohexanone, propylene carbonate, methanol, ethanol, 2-propanol, glycol and the like may be used. In addition, various types of auxiliary agent, diluent, and additive may be mixed therewith.

Next, in the step of applying the coating liquid, the coating liquid prepared in the step of preparing the coating liquid is applied onto a surface of the substrate film 10. A procedure for the applying is not particularly limited, and a well-known procedure for applying, for example, bar coating, comma coating, spray coating, reverse roll coating, knife coating, screen printing, gravure coating, die coating and the like can be employed.

Subsequently, in the step of drying, the abrasive layer 20 is formed by drying and hardening by a reaction in the coating liquid thus applied. Specifically, for example, hot air of no lower than 90° C. and no higher than 110° C. is applied to the substrate film 10 for no less than 20 hours to evaporate the solvent in the coating liquid while curing a solute, thereby forming the abrasive layer 20.

Advantages

Since the wear quantity of the abrasive layer 20 of the abrasive film is no less than 10 mg, the abrasive particles 21 are transferred into water supplied during polishing of an optical fiber connector as the abrasive layer 20 is being worn, and function as loose abrasives to polish the optical fiber connector along with fixed abrasives in the abrasive layer 20. The abrasive film thus has a great grinding force. In addition, since loose abrasives required for polishing are provided through wearing of the abrasive layer 20 even with a small load applied to the optical fiber connector, a defect is not likely to occur on an end face of the optical fiber connector, and a defect is not likely to occur due to variation in load conditions. Meanwhile, since the wear quantity of the abrasive layer 20 of the abrasive film is no greater than 25 mg, a wear quantity of the abrasive layer 20 per polishing round can be kept small, whereby the abrasive film can be used for a great number of times while maintaining a great grinding force.

Other Embodiments

The present invention is not limited to the aforementioned embodiment, and, in addition to the aforementioned embodiment, can be carried out in various modes with alterations and/or improvements being made.

Although in the aforementioned embodiment, the abrasive film in which the abrasive layer is formed directly on a surface of the substrate film has been described, a primer-treated layer for ensuring adhesiveness between the substrate film and the abrasive layer may be provided between the substrate film and the abrasive layer. A principal component of the primer-treated layer is not particularly limited as long as the adhesiveness between the substrate film and the abrasive layer can be ensured, and for example a water soluble or water dispersible polyester or acrylic resin; a resin in which an unsaturated bond-containing compound is grafted to a water soluble or water dispersible hydrophilic group-containing polyester; and the like may be used.

The primer-treated layer can be formed by, for example, spray-coating a primer agent containing the principal component onto a surface of the substrate film and then drying. Alternatively, a substrate film having a primer-treated layer provided beforehand on a surface thereof may also be used.

In addition, the abrasive layer may have a groove. A geometry of the groove may be, for example, an equally spaced grid geometry, or a stripe geometry in which a plurality of linear grooves are arranged in a substantially parallel manner. When the abrasive layer has a groove, polishing waste etc. generated during polishing can be efficiently removed.

EXAMPLES

Hereinafter, the present invention will be explained in more detail by way of Examples and Comparative Examples, but the present invention is not limited to the following Examples.

Example 1

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first abrasive particles; 50 parts by mass of organosilica sol ("PL-7L-IPA" available from Fuso Chemical Co., Ltd., mean primary particle diameter: 75 nm, solid content: 20% by mass) as the second abrasive particles; 13 parts by mass of organosilica sol ("MEK-ST-2040" available from Nissan Chemical Industries, Ltd., mean primary particle diameter: 200 nm, solid content: 40% by mass) as the larger diameter second abrasive particles; 27 parts by mass of a N,N-dimethylformamide solution containing 5% by mass of an acrylonitrile-butadiene rubber ("N230S" available from JSR Co., Ltd.) as the binder; 27 parts by mass of a methyl ethyl ketone solution containing 5% by mass of a cellulose resin ("ETHOCEL 100" available from Nisshin Kasei Co., Ltd.) as the binder; and 3 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 µm) as the substrate by the bar coating procedure, and dried in an oven at 100° C., whereby an abrasive film having an abrasive particle content as shown in Table 1 was obtained. An average thickness of the abrasive layer was 6 µm.

Example 2

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first abrasive particles; 39 parts by mass of organosilica sol ("PL-7L-IPA" available from Fuso Chemical Co., Ltd., mean primary particle diameter: 75 nm, solid content: 20% by mass) as the second abrasive particles; 19 parts by mass of organosilica sol ("MEK-ST-2040" available from Nissan Chemical Industries, Ltd., mean primary particle diameter: 200 nm, solid content: 40% by mass) as the larger diameter second abrasive particles; 30 parts by mass of a N,N-dimethylformamide solution containing 5% by mass of an acrylonitrile-butadiene rubber ("N230S" available from JSR Co., Ltd.) as the binder; 30 parts by mass of a methyl ethyl ketone solution containing 5% by mass of a cellulose resin ("ETHOCEL 100" available from Nisshin Kasei Co., Ltd.) as the binder; and 4 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 µm) as the substrate by the bar coating procedure, and dried in an oven at 100° C., whereby an abrasive film having an abrasive particle content as shown in Table 1 was obtained. An average thickness of the abrasive layer was 5 µm.

Example 3

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first abrasive particles; 74 parts by mass of organosilica sol ("PL-7L-IPA" available from Fuso Chemical Co., Ltd., mean primary particle diameter: 75 nm, solid content: 20% by mass) as the second abrasive particles; 12 parts by mass of organosilica sol ("MEK-ST-2040" available from Nissan Chemical Industries, Ltd., mean primary particle diameter: 200 nm, solid content: 40% by mass) as the larger diameter second abrasive particles; 35 parts by mass of a N,N-dimethylformamide solution containing 5% by mass of an acrylonitrile-butadiene rubber ("N230S" available from JSR Co., Ltd.) as the binder; 35 parts by mass of a methyl ethyl ketone solution containing 5% by mass of a cellulose resin ("ETHOCEL 100" available from Nisshin Kasei Co., Ltd.) as the binder; and 5 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 µm) as the substrate by the bar coating procedure, and dried in an oven at 100° C., whereby an abrasive film having an abrasive particle content as shown in Table 1 was obtained. An average thickness of the abrasive layer was 5 µm.

Example 4

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first abrasive particles; 54 parts by mass of organosilica sol ("PL-7L-IPA" available from Fuso Chemical Co., Ltd., mean primary particle diameter: 75 nm, solid content: 20% by mass) as the second abrasive particles; 7 parts by mass of organosilica sol ("IPA-ST-ZL" available from Nissan Chemical Industries, Ltd., primary particle diameter: 70 to 100 nm, solid content: 30% by mass) as the second abrasive particles; 42 parts by mass of a N,N-dimethylformamide solution containing 5% by mass of an acrylonitrile-butadiene rubber ("N230S" available from JSR Co., Ltd.) as the binder; and 3 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive particle content as shown in Table 1 was obtained. An average thickness of the abrasive layer was 8 μm.

Example 5

A coating liquid was obtained by mixing: 150 parts by mass of organosilica sol ("MEK-ST" available from Nissan Chemical Industries, Ltd., primary particle diameter: 10 to 20 nm, solid content: 30% by mass) as the first abrasive particles; 75 parts by mass of organosilica sol ("PL-7L-IPA" available from Fuso Chemical Co., Ltd., mean primary particle diameter: 75 nm, solid content: 20% by mass) as the second abrasive particles; 20 parts by mass of organosilica sol ("MEK-ST-2040" available from Nissan Chemical Industries, Ltd., mean primary particle diameter: 200 nm, solid content: 40% by mass) as the larger diameter second abrasive particles; 27 parts by mass of a N,N-dimethylformamide solution containing 5% by mass of an acrylonitrile-butadiene rubber ("N230S" available from JSR Co., Ltd.) as the binder; 27 parts by mass of a methyl ethyl ketone solution containing 5% by mass of a cellulose resin ("ETHOCEL 100" available from Nisshin Kasei Co., Ltd.) as the binder; and 3 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive particle content as shown in Table 1 was obtained. An average thickness of the abrasive layer was 7 μm.

Comparative Example 1

An abrasive film having an abrasive particle content as shown in Table 1 was obtained in a similar manner to Example 4, except that a coating liquid was used in which: the organosilica sol ("MEK-ST" available from Nissan Chemical Industries, Ltd., primary particle diameter: 10 to 20 nm, solid content: 30% by mass) as the first abrasive particles was in an amount of 41 parts by mass; the organosilica sol ("PL-7L-IPA" available from Fuso Chemical Co., Ltd., mean primary particle diameter: 75 nm, solid content: 20% by mass) as the second abrasive particles was in an amount of 22 parts by mass; the organosilica sol ("IPA-ST-ZL" available from Nissan Chemical Industries, Ltd., primary particle diameter: 70 to 100 nm, solid content: 30% by mass) as the second abrasive particles was in an amount of 3 parts by mass; and the binders were the same as those of Example 4. An average thickness of the abrasive layer was 8 μm.

Comparative Example 2

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first diameter abrasive particles; 37 parts by mass of organosilica sol ("PL-7L-IPA" available from Fuso Chemical Co., Ltd., mean primary particle diameter: 75 nm, solid content: 20% by mass) as the second abrasive particles; 45 parts by mass of a N,N-dimethylformamide solution containing 5% by mass of acrylonitrile-butadiene rubber ("N230S" available from JSR Co., Ltd.) as the binder; and 4 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive particle content as shown in Table 1 was obtained. An average thickness of the abrasive layer was 7 μm.

Comparative Example 3

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first diameter abrasive particles; 30 parts by mass of a N,N-dimethylformamide solution containing 5% by mass of acrylonitrile-butadiene rubber ("N230S" available from JSR Co., Ltd.) as the binder; and 2 parts by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive particle content as shown in Table 1 was obtained. An average thickness of the abrasive layer was 5 μm.

Comparative Example 4

A coating liquid was obtained by mixing: 100 parts by mass of organosilica sol ("MEK-ST" available from Nissan Chemical Industries, Ltd., primary particle diameter: 10 to 20 nm, solid content: 30% by mass) as the first abrasive particles; 50 parts by mass of organosilica sol ("PL-7L-IPA" available from Fuso Chemical Co., Ltd., mean primary particle diameter: 75 nm, solid content: 20% by mass) as the second abrasive particles; 13 parts by mass of organosilica sol ("MEK-ST-2040" available from Nissan Chemical Industries, Ltd., mean primary particle diameter: 200 nm, solid content: 40% by mass) as the larger diameter second abrasive particles; 15 parts by mass of a N,N-dimethylformamide solution containing 5% by mass of an acrylonitrile-butadiene rubber ("N230S" available from JSR Co., Ltd.) as the binder; 15 parts by mass of a methyl ethyl ketone solution containing 5% by mass of a cellulose resin ("ETHOCEL 100" available from Nisshin Kasei Co., Ltd.) as the binder; and 1 part by mass of polyisocyanate ("Desmodur L75C" available from Sumika Bayer Urethane Co., Ltd., solid content: 75% by mass) as the binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive particle content as shown in Table 1 was obtained. An average thickness of the abrasive layer was 8 μm.

Evaluation Procedures

Determination of a wear quantity, and a polishing test were conducted for the abrasive films obtained in Examples 1 to 5 and Comparative Examples 1 to 4. The results are shown in Table 1.

Wear Quantity

Three test pieces (average diameter: 100 mm, average thickness: no less than 0.08 mm and no greater than 0.09 mm) were provided for each of the abrasive films obtained in Examples 1 to 5 and Comparative Examples 1 to 4. Each test piece was rotated 50 times by using a Taber abrasion tester under conditions involving a load of 4.9 N and rotational speed of 72 rpm, with an abrasive wheel CS-10, to thereby wear the test piece. Then, differences in mass of the test pieces before and after the 50 rotations were measured and averaged.

Polishing Test

65°) of a polishing machine ("OFL-15" available from Seikoh Giken Co., Ltd.); and polishing for 120 seconds at a rotation rate of 180 rpm and with a load of 1,500 g, with ion exchanged water as a polishing liquid.

Acceptable Product Rate

The acceptable product rate of the polished optical fiber connectors was calculated by the following procedure.

A polished face of the polished optical fiber connector was observed by using "Video Fiber Microscope" available from Westover Scientific, Inc. The optical fiber connector having a favorable end face with no adhered matter and no scratch being observed was assessed as an "acceptable product", and the optical fiber connector having an unfavorable end face with an adhered matter or a scratch being observed was assessed as an "unacceptable product". This assessment was conducted for 24 polished terminals, and the acceptable product rate was calculated based on the results thereof according to the following formula:

Acceptable product rate=(Number of acceptable products)/24 ×100(%).

TABLE 1

| | | Contents with respect to total abrasive particles according to primary particle diameter | | | | | |
|---|---|---|---|---|---|---|---|
| | Content of abrasive particles in abrasive layer (% by mass) | First abrasive particles (% by mass) | Second abrasive particles (% by mass) | Larger diameter second abrasive particles (% by mass) | Average thickness of abrasive layer (μm) | Wear quantity mg | Acceptable product rate (%) |
| Example 1 | 89 | 66 | 34 | 12 | 6 | 16 | 100 |
| Example 2 | 88 | 66 | 34 | 17 | 5 | 13 | 88 |
| Example 3 | 87 | 60 | 40 | 10 | 5 | 13 | 79 |
| Example 4 | 91 | 70 | 30 | 0 | 8 | 17 | 96 |
| Example 5 | 92 | 66 | 34 | 12 | 7 | 24 | 100 |
| Comparative Example 1 | 80 | 70 | 30 | 0 | 8 | 8 | 8 |
| Comparative Example 2 | 88 | 80 | 20 | 0 | 7 | 8 | 4 |
| Comparative Example 3 | 91 | 100 | 0 | 0 | 5 | 5 | 0 |
| Comparative Example 4 | 95 | 66 | 34 | 12 | 8 | 31 | — |

By using the abrasive films obtained in Examples 1 to 5 and Comparative Examples 1 to 4, a polishing test of an optical fiber connector provided by attaching an optical fiber to a ferrule ("SC ferrule" available from Seikoh Giken Co., Ltd.) was conducted by using these abrasive sheets.

Polishing Conditions

First, the abrasive film was punched to give a circular shape of 127 mm in diameter and adhesively fixed onto an elastic pad (hardness: 55°) of a polishing machine ("OFL-15" available from Seikoh Giken Co., Ltd.). A connection end face of the optical fiber connector, having been subjected to intermediate finish polishing, was subjected to final finish polishing for 60 seconds with a load of 1,500 g and at a rotation rate of 180 rpm, with ion exchanged water as a polishing liquid. A set of 12 optical fiber connector terminals was polished at once. The polishing was carried out for two sets of the optical fiber connector terminals, i.e., 24 optical fiber connector terminals in total.

It is to be noted that the intermediate finish polishing was carried out by: adhesively fixing an abrasive film containing diamond abrasive particles having an average primary particle diameter of 1 μm ("TOPXD150" available from Bando Chemical Co., Ltd.) onto an elastic material pad (hardness:

It is to be noted that the symbol "-" in Table 1 means a failure to determine the acceptable product rate as a result of uncompleted polishing due to the abrasive layer being worn out because of an excessive wear quantity.

The results shown in Table 1 reveal that the abrasive films of Examples 1 to 5 have given higher acceptable product rates than the abrasive films of Comparative Examples 1 to 4. On the contrary, the abrasive films of Comparative Examples 1 to 3 having smaller wear quantities have given low acceptable product rates, even with varied contents of the abrasive particles with respect to the abrasive layer and varied primary particle diameter distributions of the abrasive particles. Meanwhile, the abrasive film of Comparative Example 4 having a great wear quantity has not given an acceptable product, due to the abrasive layer being worn out by polishing for a predetermined time period. This shows that, with the wear quantity of the abrasive layer as determined by a Taber abrasion test is no less than 10 mg and no greater than 25 mg, the abrasive films of Examples 1 to 5 have a great grinding force and are not likely to cause an end face defect of an optical fiber connector.

A comparison between Example 1 and Example 4 indicates that Example 1 resulted in a higher acceptable product rate, despite a smaller content of the abrasive particles with respect to the abrasive layer than that of Example 4. Therefore, it is revealed that, when the content of the larger diameter second abrasive particles having a primary particle diameter of no less than 100 nm and less than 250 nm with respect to the total abrasive particles is no less than 5% by mass and no greater than 25% by mass, the wear quantity of the abrasive layer is suitably controlled.

INDUSTRIAL APPLICABILITY

The abrasive film according to the present invention has a great grinding force while providing a small wear quantity of the abrasive layer per polishing round, and is not likely to cause an end face defect of an optical fiber connector due to variation in load conditions during polishing. Therefore, the abrasive film can be suitably used in a step of finish polishing of an optical fiber connector.

The invention claimed is:

1. An abrasive film comprising a substrate film and an abrasive layer that is overlaid on a top face side of the substrate film, wherein:
   the abrasive layer comprises abrasive particles and a binder for the abrasive particles;
   the abrasive particles comprise first abrasive particles having a primary particle diameter of no less than 10 nm and less than 50 nm, and second abrasive particles having a primary particle diameter of no less than 50 nm and less than 250 nm;
   a content of the first abrasive particles is no less than 55% by mass and no greater than 80% by mass, and a content of the second abrasive particles is no less than 15% by mass and no greater than 45% by mass, with respect to total abrasive particles;
   a wear quantity of the abrasive layer as determined by a Taber abrasion test is no less than 10 mg and no greater than 25 mg; and
   a content of the abrasive particles in the abrasive layer is no less than 85% by mass.

2. The abrasive film according to claim 1, wherein a content of the second abrasive particles having a primary particle diameter of no less than 100 nm and less than 250 nm is no less than 5% by mass and no greater than 25% by mass with respect to the total abrasive particles.

3. The abrasive film according to claim 1, wherein an average thickness of the abrasive layer is no less than 4 μm and no greater than 15 μm.

4. The abrasive film according to claim 1, wherein the abrasive particles are silica particles.

\* \* \* \* \*